Patented Oct. 28, 1930

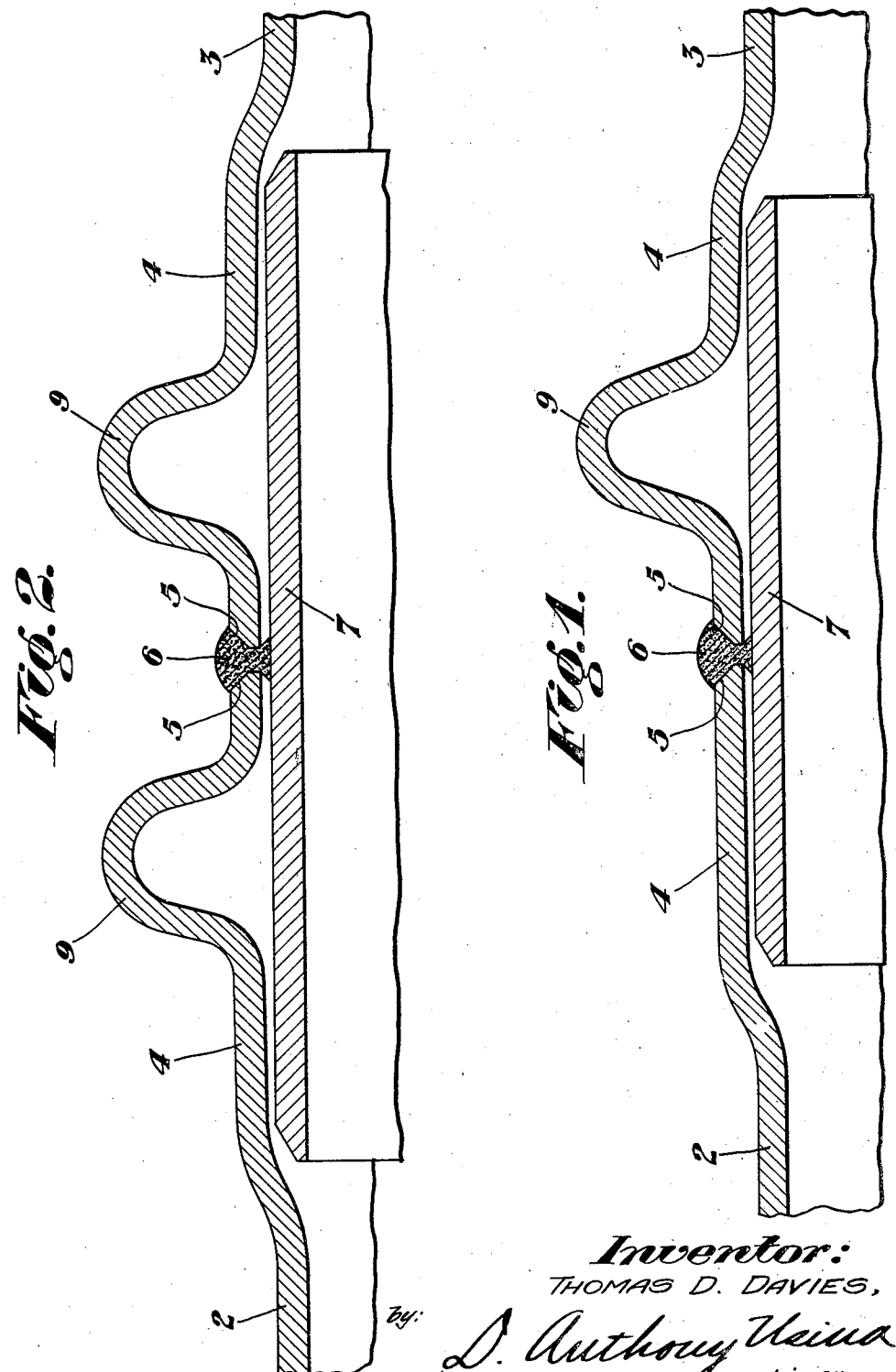

1,779,902

UNITED STATES PATENT OFFICE

THOMAS D. DAVIES, OF McKEESPORT, PENNSYLVANIA, ASSIGNOR TO NATIONAL TUBE COMPANY, A CORPORATION OF NEW JERSEY

EXPANSIBLE PIPE JOINT

Application filed December 11, 1928. Serial No. 325,170.

This invention relates to pipe joints and more particularly to welded joints for pipe lines, and has for its object the provision of a novel form of welded joint having integrally formed flexible expansion rings for taking up the expansion in the pipe line and thereby preventing damage to the weld.

Another object is to provide a joint having the novel design, construction and combination of parts hereinafter described and illustrated in the accompanying drawings, in which—

Figure 1 is a sectional plan showing an expansible pipe joint embodying my invention.

Figure 2 is a similar sectional plan showing a modified form of pipe joint made in accordance with my invention.

Referring more particularly to the drawings the numerals 2 and 3 designate the pipe sections to be joined which have their adjacent ends expanded to form tapering bell ends 4.

The outer peripheral edges of the bell ends 4 are beveled, as at 5, so that when the pipe ends are assembled for welding the beveled edges will form a V-shaped slot to receive the welding metal 6.

The pipe ends, when assembled for welding, are spaced a slight distance apart so that the welding metal 6 may penetrate entirely through between the pipe ends, and a sleeve 7 is positioned within the bell ends 4 to form a shelf upon which the penetrating welding metal is stopped. The sleeve 7 also serves as a reenforce and guide for the pipe ends as they flex under the expansion forces.

The sleeve 7 is of materially less length than the combined length of the bell ends 4 so as not to interfere with the expansion movement of the pipe ends and it has an inside diameter substantially equal to the inside diameter of the pipe so as not to obstruct the flow passage, while its outside diameter is slightly less than the inside diameter of the bell ends 4 so as to leave a slight space surrounding the sleeve into which the welding metal 6 is projected.

In Figure 1 I have shown a joint having one of the bell ends 4 expanded intermediate its ends to form a circumferential enlargement or ring 9 having substantially parallel side walls. The ring 9 serves as a flexible expansion ring whose side walls are adapted to flex toward one another when the pipe line expands, thus absorbing the expansion forces and eliminating said strains from the welded joint.

In Figure 2 I have shown a joint, the same in all respects as that described above except that both of the bell ends 4 are provided with expansion rings 9. The construction is particularly adapted for use in large diameter pipe and where the pipe lines are subjected to extreme expansion since the two rings 9 provided in each joint will flex sufficiently to absorb all the expansion forces that it is possible to develop in a commercial pipe line.

While I have shown and described certain specific embodiments of my invention it will be understood that I do not wish to be limited thereto since various modifications may be made without departing from the scope thereof, as defined in the appended claims.

I claim—

1. A welded pipe joint comprising, in combination, a pair of adjacent pipe ends, said pipe ends being spaced an appreciable distance apart and being expanded to form bell portions, at least one of said bell ends being expanded intermediate its ends to form at least one flexible expansion ring having substantially parallel sides, a sleeve mounted within said bell ends and being of less length than the combined length of said bell ends so as not to prevent the free expansion of all pipes, and a deposit of welding metal for securing said pipe ends together.

2. A welded pipe joint comprising, in combination, a pair of adjacent pipe ends, said pipe ends being spaced an appreciable distance apart and being expanded to form bell portions, at least one of said bell ends being expanded intermediate its ends to form at least one flexible expansion ring having substantially parallel sides, a sleeve mounted within said bell ends and being of less length than the combined length of said bell ends so as not to prevent the free expansion of all pipes, said bell ends having their outer peripheral edges beveled so as to form a V- shaped recess, and a filling of welding metal in said V-shaped recess and between said spaced ends of said pipes and extending within said pipes and onto said sleeve.

3. A welded pipe joint comprising, in combination, a pair of adjacent pipe ends, said pipe ends being spaced an appreciable distance apart and being expanded to form bell portions, said bell ends being each expanded intermediate their ends to form at least one flexible expansion ring in each bell end having substantially parallel sides, a sleeve mounted within said bell ends and being of less length than the combined length of said bell ends so as not to prevent the free expansion of said pipes, and a deposit of welding metal for securing said pipe ends together.

4. A welded pipe joint comprising, in combination, a pair of adjacent pipe ends, said pipe ends being spaced an appreciable distance apart and being expanded to form bell portions, said bell ends being each expanded intermediate their ends to form at least one flexible expansion ring in each bell end having substantially parallel sides, a sleeve mounted within said bell ends and being of less length than the combined length of said bell ends so as not to prevent the free expansion of said pipes, said bell ends having their outer peripheral edges beveled so as to form a V-shaped recess, and a filling of welding metal in said V-shaped recess and between said spaced ends of said pipes and extending within said pipes and onto said sleeve.

In testimony whereof I have hereunto set my hand.

THOMAS D. DAVIES.